J. M. HEAD.
AUTOMOBILE HEADLIGHT.
APPLICATION FILED DEC. 13, 1920.
1,435,296.
Patented Nov. 14, 1922.
2 SHEETS—SHEET 1.
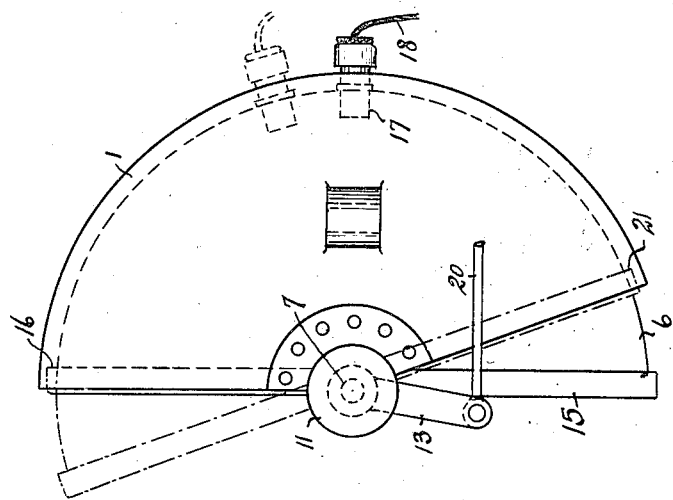
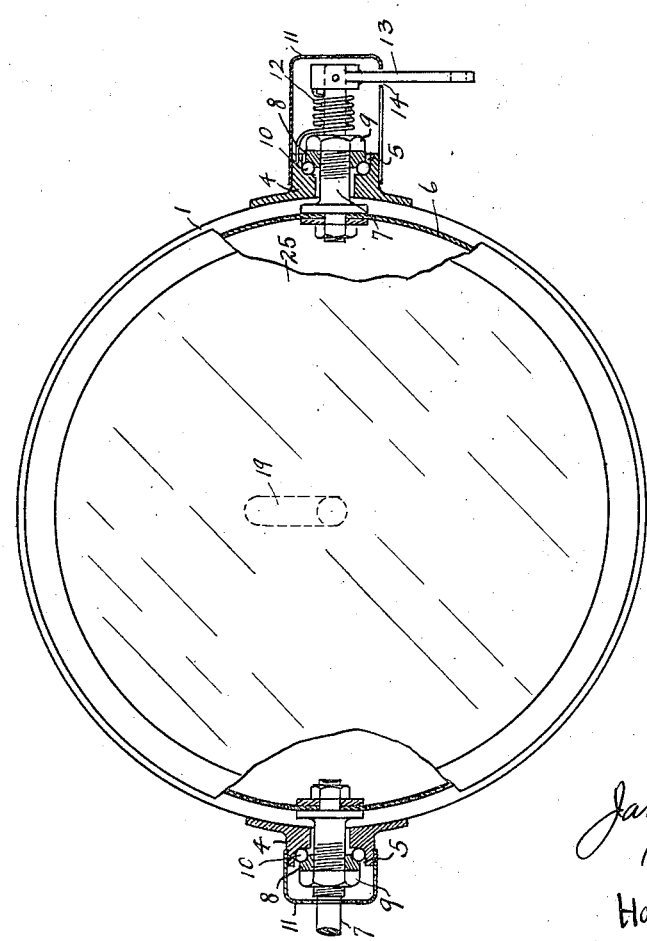
Inventor
James M. Head
By
Hardway Cathey
Attorneys.

J. M. HEAD.
AUTOMOBILE HEADLIGHT.
APPLICATION FILED DEC. 13, 1920.
1,435,296.
Patented Nov. 14, 1922.
2 SHEETS—SHEET 2.
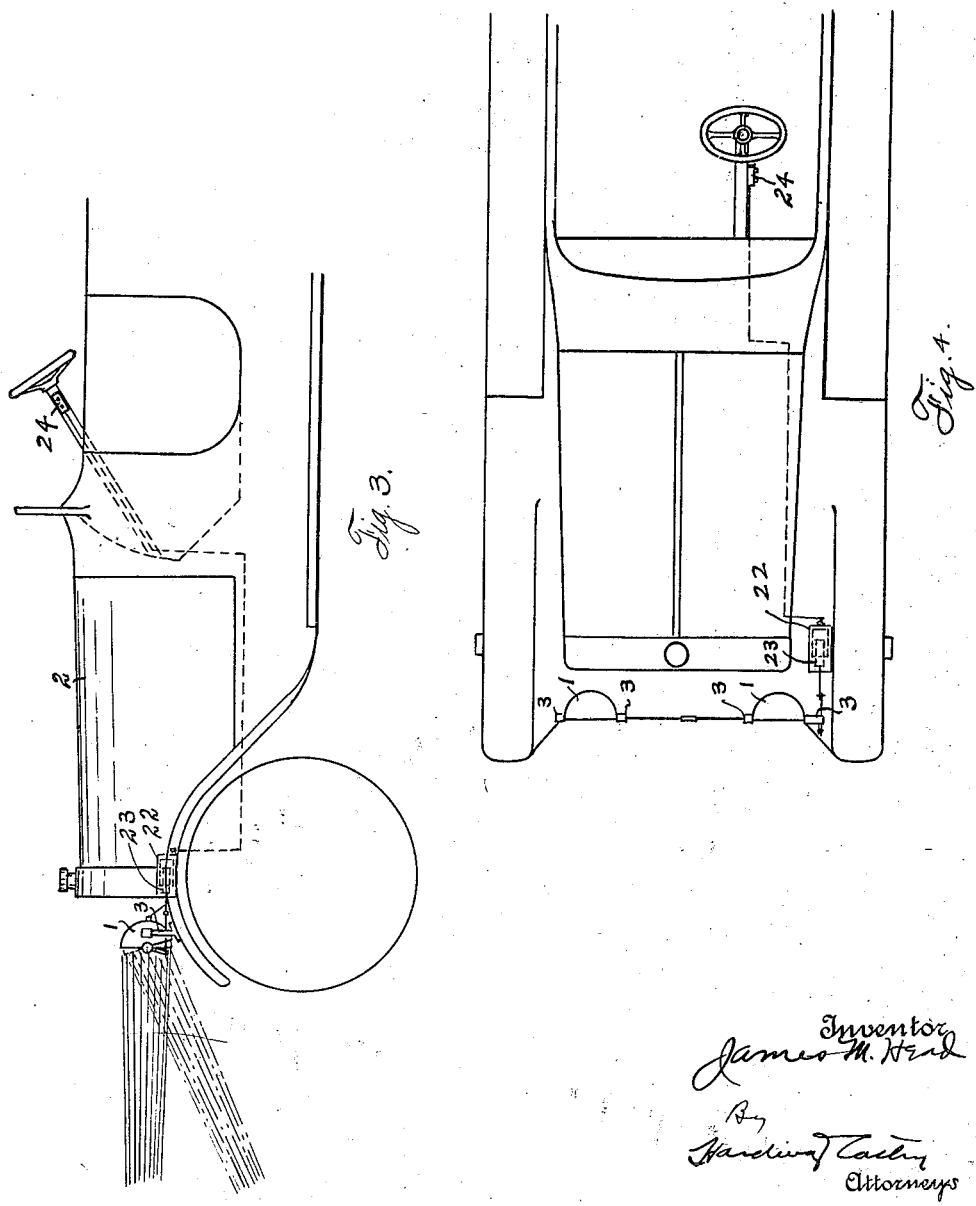

Patented Nov. 14, 1922.

1,435,296

UNITED STATES PATENT OFFICE.

JAMES M. HEAD, OF HOUSTON, TEXAS.

AUTOMOBILE HEADLIGHT.

Application filed December 13, 1920. Serial No. 430,183.

*To all whom it may concern:*

Be it known that I, JAMES M. HEAD, a citizen of the United States, residing at Houston, in the county of Harris and State of Texas, have invented certain new and useful Improvements in an Automobile Headlight, of which the following is a specification.

This invention relates to new and useful improvements in an automobile headlight.

One object of the invention is to provide a headlight for vehicles whereby the rays of light are normally thrown forwardly in the usual way but which is equipped with a movable lens and reflector by means of which the rays of light may be thrown downwardly, so that when meeting another vehicle the rays of light will be cast down on the road-way below the normal line of vision of the driver of the approaching vehicle in order that said driver will not be blinded by the light.

Another object of the invention is to provide a headlight of the character described which is of simple construction and which may be operated either mechanically or electrically.

With the above and other objects in view the invention has particular relation to certain novel features of construction, operation and arrangement of parts, an example of which is given in this specification and illustrated in the accompanying drawings, wherein:—

Figure 1 is a front view of the head light partially broken away and shown in section.

Figure 2 is a side view thereof.

Figure 3 is a fragmentary side view of an automobile equipped with the improved form of headlight, and Figure 4 is a fragmentary plan view thereof.

Referring now more particularly to the drawings wherein like numerals of reference designate similar parts in each of the figures, the numeral 1 designates a stationary shell or casing which is fixed in position relative to the automobile 2 by means of suitable brackets 3. This shell is preferably composed of sheet metal and is of the general contour of a spherical segment. Attached to each side of said hood there is a bearing 4, each bearing being formed with a circular raceway 5. Within the casing there is a reflector 6, hemispherical in general contour. This reflector has the spindles 7, 7, one secured thereto at each side and which project out through the corresponding bearings 4. A retaining ring 8 is secured to each spindle by means of a lock nut 9 and within the raceways 5 there are the anti-friction bearing members 10 which are retained therein by means of said rings 8. These anti-friction bearings are enclosed by means of suitable hoods 11, 11 to protect them and within one of said casings there is a coil spring 12 which surrounds the corresponding spindle and one end of which is attached to the adjacent bearing 4 and the other end of which is secured to the arm 13 which is fixed to the outer end of said spindle and works through a slot 14 in the corresponding casing 11. This spring normally holds the reflector in vertical position so as to cast the rays of light through a lens 25, carried by the reflector, directly in front of the vehicle, and the reflector has an annular rim 15 which contacts against a corresponding arcuate shoulder 16 around the upper part of the casing so as to hold said reflector in said position. A light socket 17 is attached to the center of the reflector and is connected to the electric wiring 18 of the vehicle and as the reflector is manipulated said light moves in the vertical slot 19 cut through the casing 1. When it is desired to cast the rays of light downwardly onto the road immediately in front of the vehicle, this may be accomplished by any suitable mechanical device which is operated from the dash or steering column of the vehicle. A cable 20 is shown attached to the free end of the arm 13 for this purpose, a pull on which will overcome the tension of the spring 12 and move the reflector into the position indicated in dotted lines in Figure 2, in which position the lower part of the rim 15 will contact against the arcuate shoulder 21 into which the lower part of the casing is formed, the range of movement of the reflector thus being limited by the shoulders 16 and 21. The device as shown in Figures 3 and 4, is arranged to be electrically operated by means of a solenoid 22 having the core 23. This core is connected to the arm 13 and a switch 24 is carried by the steering column and by the manipulation of which said solenoid may be energized. When the switch is turned on so as to complete a circuit through the solenoid, the core 23 will be withdrawn, operating to deflect the rays downwardly and when said switch is operated to break the current the spring 12 will operate to restore the reflector to normal position.

What I claim is:—

An automobile headlight, including a stationary casing having a vertical slot and formed with side bearings, a reflector, a spindle fixed to each side of the reflector, said spindles working in said bearings and pivotally mounting the reflector in the casing to permit the free rotation thereof, a lens carried by and movable with the reflector, a light socket fixed to the reflector behind the lens and working through said slot, an arm connected to one of the spindles through which the reflector, lens and light socket may be moved as a unit, on pivots in one direction, a coil spring connected to one of said spindles and the corresponding bearing for moving the reflector, lens, and light socket in the other direction, the upper and lower margins of the reflector being formed into stops, arranged to contact with the casing to limit the range of movement of the reflector, in each direction relative to the casing.

In testimony whereof I have signed my name to this specification in the presence of two subscribing witnesses.

JAMES M. HEAD.

Witnesses:
 Wm. A. Cathey,
 Jas. W. Oliver.